Oct. 30, 1945. S. C. HETH 2,388,147
HEADER CONSTRUCTION FOR HARVESTING MACHINES
Filed March 25, 1944

INVENTOR.
SHERMAN C. HETH
BY William F. Buckley
ATTORNEY.

Patented Oct. 30, 1945

2,388,147

UNITED STATES PATENT OFFICE 2,388,147

HEADER CONSTRUCTION FOR HARVESTING MACHINES

Sherman C. Heth, Racine, Wis., assignor to J. I. Case Company, Racine, Wis., a corporation of Wisconsin Application March 25, 1944, Serial No. 528,064

1 Claim. (Cl. 56—158)

This invention relates to a convertible header construction for combination harvesting and threshing machines and more particularly to a novel structural organization of an outer divider, an augur trough, a sickle bar and a supporting runner so constituted and interrelated that when conditions require the outer extremity of the sickle bar, at the grain side, may be protected and slid over and shave the ground and yet under other circumstances may be freed or exposed to disentangle weeds, grain, dirt and trash.

Combination harvesting and threshing machines, the so-called "combines," include a header supported in advance or forwardly of the threshing unit and comprising an augur trough or grain receiving pan, a sickle bar supported on the forward edge of the augur trough, a reel for reeling the standing grain into contact with the sickle and for causing the cut grain to fall into the augur trough, and inner and outer dividers projecting from and co-acting with the end walls of the augur trough and equipped with the conventional divider loops.

Substantial and versatile performance is required of the outer divider, inasmuch as it must separate or divide, as well as gather, the material being cut from the uncut material. Much less is required of the inner divider although it is necessary during the first pass through the field, and also is equipped with a ground shoe to provide a support for its end of the header when it is necessary to run the harvester in very low adjustment.

The outer end wall of the augur trough and the outside divider are constituted of sheet metal plates bounded and reinforced by angle irons. At the juncture of the lower edges of the outer end wall of the augur trough and the outside divider, the sheet metal walls and their reinforcing angle irons are, respectively, cut away and upwardly displaced to provide a crotch or operating clearance for the cutting action of the extreme outer sickle section of the sickle bar, and this, without outwardly displacing or thickening the divider. In other words, at the outer end of its cutting stroke, the outer section of the sickle bar passes through and under the juncture of the outer end wall of the augur trough and the outer divider.

The present invention proposes to combine with the construction described a readily and easily attachable and detachable runner or ground shoe to span or bridge the crotch or operating clearance for the extreme outer sickle section of the sickle bar. Thus, where conditions require, the relatively vulnerable outer end of the sickle bar, which has the greatest up-and-down movement due to the swaying of the "combine," is adequately protected.

Machines of this character are used under a great variety of conditions. For example, in cutting soy beans, the machine must shave the ground. In cutting wheat, in some localities, the sickle bar may be several feet from the ground, cutting off only the heads of the grain and leaving by far the greatest percentage of straw in the field. Another material cut is flax, where, along with the grain, long green weeds grow, particularly when too much moisture is present.

The weeds and the grain itself, especially when the cutting action is performed above the level of the ground, and with the shoe or runner attached, tend to accumulate in the crotch or wedge shaped opening at the juncture of the lower edge of the outer side wall of the augur trough and the outer divider, and an appreciable amount of dirt and trash is gathered along with the accumulation described. By providing for the ready and easy removal of the outer runner or ground shoe, such an accumulation may be avoided and any that enters the crotch will be cut off by the extreme outer cutting section of the sickle bar on its return stroke. This action also is complemental to the very advantageous result of separating the cut swath from the grain which is left standing on any passage of the machine across the field.

The means devised to accomplish these functions and practical advantages has been simplified to the ultimate and consists of a bar constituting the bridge or runner across the lower wide end or bottom of the wedge shaped crotch or clearance space at the juncture of the outer side wall of the augur trough and the outer divider, and readily attachable and detachable means between the end portions of the bar and the horizontal flange of the reinforcing angle bounding the lower marginal edge of the outer side wall of the augur trough and of the outer divider.

A closely organized, simple, practical structure, and one which a farmer, in the sweat and heat of the field, may handle with ordinary tools is provided. To this end, it is proposed that one way of attaching and detaching the ends of the runner or ground shoe to the outer end of the machine, be simply bolts and nuts, the nuts having rounded heads to bear on the ground and the nuts being threaded on the shanks of the bolts and bearing directly, or through lock washers, on the upper surface of the horizontal flange of the reinforcing angle iron bridging the crotch or wedge shaped opening at the juncture of the outside end of the augur trough and outside divider.

These objects of the invention and other ancillary advantages are attained by the mechanism, construction, and arrangement illustrated in the accompanying drawing forming part hereof, in which.

Figure 1:
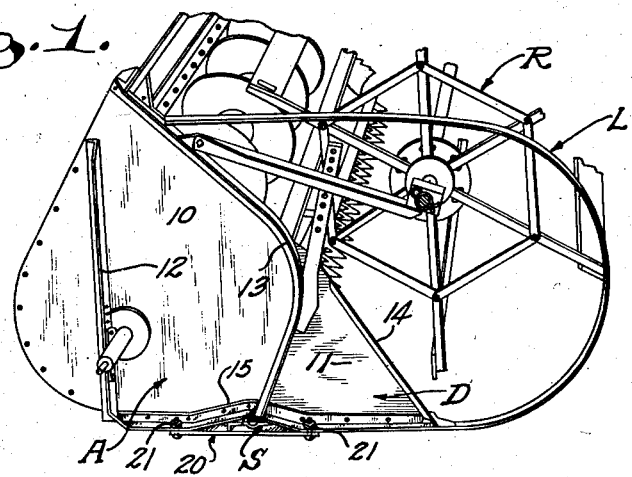
Fig. 1 is a fragmentary perspective view of the header end of a "combine" embodying the present invention.
Figure 3:
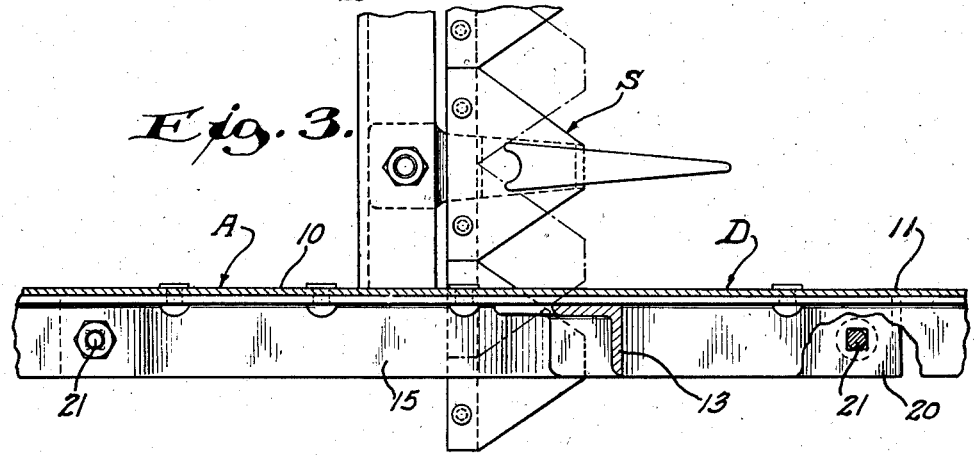
Fig. 3 is a view in horizontal cross section taken on line 3—3 of Fig. 2.

Referring to the drawing, it will be seen that the header construction embodying the present invention comprises generally the usual augur trough A, sickle S supported at the forward end of the augur trough A, dividers, the outside one of which is designated at D and pertains to the present invention, and divider loops, the outside one of which is shown and indicated at L. A reel R reels the standing grain into contact with the sickle and causes the cut grain to face into the augur trough A.

The augur trough A is of any conventional or desired construction. Likewise the inner and outer dividers. With particular reference to the outer wall of the augur trough and the outer divider, and with reference to the drawing it will be seen that they, as shown, comprise simply sheet metal plates. Both are vertically disposed and are in substantially the same vertical plane. The outer end wall of the augur trough A is designated at 10. The outer divider is designated at 11.

Reinforcing angle irons riveted or otherwise suitably attached to the outer end of the augur trough and to its combined outer divider are designated respectively at 12, 13, 14 and 15.

The angle iron 15 alone is of especial significance with respect to the present invention. It must be provided to afford the strength, ruggedness, and, in general, maintain the structural integrity of this part of the machine. But, in order to obtain the maximum efficiency of the sickle and allow the outer divider to perform its function, the angle iron 15, at the locus, where the outer end of the sickle cutter makes its outer and its inner stroke, must be kinked or bent upwardly for the required clearance.

Figure 2:
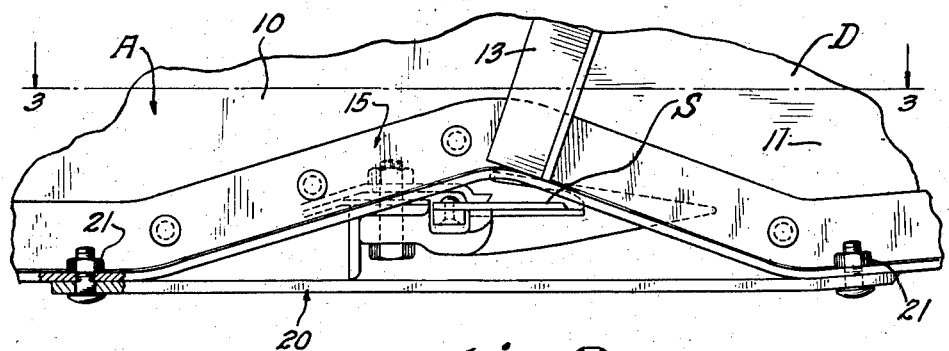
Fig. 2 is a fragmentary view in side elevation showing the bridge bar or runner and the way it is operatively interrelated with the sickle bar, augur trough and outer divider.

As shown in Fig. 2, the movable element of the sickle S can, on its outer stroke, pass through the crotch or wedge shaped opening at the juncture of the outer end wall of the augur trough and outer divider and exert an effective cutting action at its extreme outside end.

Combined with the instrumentalities described at the outer end of the machine is a runner or ground shoe 20. The ground shoe 20 is in the form of a bar of metal of rectangular form. It spans or bridges the crotch or wedge shaped clearance opening for the sickle bar. Its ends are readily and releasably attachable and detachable from the horizontal flange at the ends of the kink or upward bend of the reinforcing flange 15 by means of bolts and nuts 21.

The operating characteristics and advantages of the invention have been fully set forth and in conjunction with the accompanying drawing may be readily apprehended.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claim.

What I claim is:

A header of the character described and including an augur trough, an outside divider, said augur trough having an outer end wall constituted of a sheet metal plate, said outside divider also comprising a sheet metal plate, forming a continuation of the augur trough end wall, the sheet metal plates being vertically disposed and being cooperatively interrelated, reinforcing angle irons permanently interconnected with the sheet metal plates and inclusive of an angle iron bordering the lower margin of the outside wall of the augur trough and the lower margin of the outer divider, the metal of the sheet metal plates of the outside wall of the augur trough and of the outer divider being recessed to form a downwardly facing opening at the bottom of the juncture of said plates, the reinforcing angle iron bordering the lower margin of the outside wall of the augur trough and the outside divider being provided with an upward projection at said juncture to form a border for the downwardly facing opening, a sickle mounted on the forward edge of the bottom of the augur trough and having a reciprocable cutting element, the outer extremity of which passes through said opening on its outward and inward strokes, a bar-like runner bridging the entrance to said opening and having its ends secured to portions of the horizontal flange of the reinforcing angle iron lying along the lower margin of the augur trough and the outside divider, the ends of the bar being apertured, the horizontal flange of the reinforcing angle iron disposed along said lower margin having registered apertures and bolts and nuts forming said securing means for readily and releasably attaching and detaching the bar-like runner to the augur trough and to the outside divider, the heads of the bolts being disposed to engage the ground, the shanks of the bolts being extended through said registering apertures and the nuts being threaded on the shanks of the bolts and bearing against the upper surface of said horizontal flange.

SHERMAN C. HETH.